United States Patent
Pause et al.

(10) Patent No.: US 10,189,213 B2
(45) Date of Patent: Jan. 29, 2019

(54) METHOD AND MANUFACTURING UNIT FOR PRODUCING FIBER COMPOSITE MATERIAL COMPONENTS

(75) Inventors: Bernhard Pause, Mosbach (DE); Christian Boge, Mosbach (DE)

(73) Assignee: Broetje-Automation GmbH, Rastede (DE)

(*) Notice: Subject to any disclaimer, the term of this patent is extended or adjusted under 35 U.S.C. 154(b) by 0 days.

(21) Appl. No.: 13/988,124

(22) PCT Filed: Nov. 18, 2011

(86) PCT No.: PCT/EP2011/070418
§ 371 (c)(1),
(2), (4) Date: May 17, 2013

(87) PCT Pub. No.: WO2012/066109
PCT Pub. Date: May 24, 2012

(65) Prior Publication Data
US 2013/0228285 A1  Sep. 5, 2013

(30) Foreign Application Priority Data
Nov. 19, 2010 (DE) .................... 10 2010 044 175

(51) Int. Cl.
*B29C 70/38* (2006.01)

(52) U.S. Cl.
CPC ............ *B29C 70/38* (2013.01); *B29C 70/388* (2013.01)

(58) Field of Classification Search
CPC ..... B29C 70/38; B29C 70/382; B29C 70/384; B29C 70/386; B29C 70/388; B29C 2043/5891; G01B 11/028
(Continued)

(56) References Cited

U.S. PATENT DOCUMENTS 5,141,585 A    8/1992  Shinno et al.
5,327,523 A *  7/1994  Itoh ..................... G05B 19/416
                                                       700/260
(Continued)

FOREIGN PATENT DOCUMENTS

EP    1334819 A1    8/2003
EP    1810816 A2    7/2007
(Continued)

OTHER PUBLICATIONS

German Search Report DE 10 2010 044 175.9; dated Jun. 6, 2011; 8 pages.
(Continued)

*Primary Examiner* — William P Bell
(74) *Attorney, Agent, or Firm* — Pauly, DeVries Smith & Deffner LLC

(57) ABSTRACT

In a method and apparatus for producing fiber composite material components, a first web of the fiber composite material is applied to a mold by means of an application tool arranged on a positioning device. A height profile of the applied first web is measured by means of a height profile measuring sensor. During the application of a second web of the fiber composite material to the mold, a control device activates at least one drive motor of the positioning device depending on the measured height profile, so that application errors, such as overlapping of the webs, are avoided. The webs are applied in opposite application directions by rotating the application tool 180° relative to the positioning device upon a change in the application direction. Two height profile measuring sensors arranged next to one another on the application tool for measuring the height profile of the applied webs.

13 Claims, 7 Drawing Sheets

(58) Field of Classification Search
USPC .......................................................... 348/88
See application file for complete search history.

(56) References Cited

U.S. PATENT DOCUMENTS

| | | | |
|---|---|---|---|
| 5,431,749 A | 7/1995 | Messner | |
| 6,799,619 B2* | 10/2004 | Holmes et al. | ............... 156/358 |
| 7,766,063 B2 | 8/2010 | Lauder et al. | |
| 7,835,567 B2 | 11/2010 | Oldani | |
| 8,377,239 B2 | 2/2013 | Engelbart et al. | |
| 2006/0180270 A1* | 8/2006 | Ledet | .................... B29C 70/386 |
| | | | 156/250 |
| 2006/0260751 A1* | 11/2006 | Lauder | .................. B29C 70/388 |
| | | | 156/382 |
| 2009/0043533 A1* | 2/2009 | Brennan et al. | ............. 702/152 |
| 2009/0076638 A1* | 3/2009 | Hu et al. | .......................... 700/97 |
| 2009/0148030 A1* | 6/2009 | Engelbart | .......... G01N 21/8851 |
| | | | 382/141 |
| 2009/0301648 A1* | 12/2009 | Hogg et al. | ................... 156/230 |

FOREIGN PATENT DOCUMENTS

| | | | | |
|---|---|---|---|---|
| EP | 2072224 A2 | 6/2009 | | |
| EP | 2502731 A1 * | 9/2012 | ......... | B29C 43/3697 |
| JP | 01247146 A | 10/1989 | | |
| WO | 2006118692 A1 | 11/2006 | | |

OTHER PUBLICATIONS

International Search Report PCT/EP2011/070418; dated Apr. 10, 2012; 10 pages.

* cited by examiner

METHOD AND MANUFACTURING UNIT FOR PRODUCING FIBER COMPOSITE MATERIAL COMPONENTS

CROSS-REFERENCES TO RELATED APPLICATIONS

This application claims the priority of German Patent Application, Serial No. 10 2010 044 175.9, filed Nov. 19, 2010, and is a national phase filing of PCT/EP2011/070418 filed Nov. 18, 2011 pursuant to 35 U.S.C. 119(a)-(d), the content of which is incorporated herein by reference in its entirety as if fully set forth herein.

FIELD OF THE INVENTION

The invention relates to a method and a manufacturing unit for producing fiber composite material components.

BACKGROUND OF THE INVENTION

A method for producing fiber composite material components is known from EP 2 072 224 A2, in which irregularities during the application of the fiber composite material are detected by means of a detection system. To detect irregularities, a check is made as to whether they are to be attributed to a malfunction of the cutting device provided to cut the fiber composite material. The functioning of the cutting device is constantly monitored in this manner. Malfunctions of the cutting device that are detected are immediately notified to an operator or used to interrupt the production process.

SUMMARY OF THE INVENTION

The invention is based on an object of providing a method, which allows the production of fiber composite material components with high productivity and quality. This object is achieved by a method for producing fiber composite material components comprising the following steps: the step of providing a manufacturing unit to apply a fiber composite material to a component mould, wherein the manufacturing unit has a positioning device and an application tool arranged thereon, wherein the positioning device to position the application tool relative to the component mould has a plurality of drive motors, which are activatable by means of a control device, and wherein the manufacturing unit has at least one height profile measuring sensor with a detection range directed onto the component mould; the step of applying a first web of the fiber composite material to the component mould; the step of measuring a height profile in such a way that at least a part of the applied first web is located in the detection range of the height profile measuring sensor; and, the step of applying a second web of the fiber composite material to the component mould in such a way that the control device activates at least one of the drive motors depending on the measured height profile, wherein the webs are applied in opposite application directions, and wherein the manufacturing unit has two height profile measuring sensors arranged next to one another on the application tool, and the application tool is rotated through 180° relative to the positioning device upon a change in the application direction.

According to the invention, a web of the fiber composite material is applied to the component mould depending on a measured height profile of a previously applied web of the fiber composite material. For this purpose, the manufacturing unit has at least one height profile measuring sensor, which measures the height profile in a detection region, which is directed onto the component mould and in which at least a part of the applied web is located. In a subsequent application process, the measured height profile is used by the control device to activate at least one of the drive motors of the positioning device, so that application errors are avoided and/or already existing application errors are reduced by a corresponding positioning of the application tool. For example, an overlap or too large a gap can be avoided in the case of webs to be applied laterally next to one another. Furthermore, for example, height or thickness differences can be detected, which can be reduced in a subsequent application process by changing the contact pressing force of the application tool. The fiber composite material is generally also called a prepreg or laminate. Furthermore, the applied webs are generally also called courses.

Application errors can therefore be avoided and/or reduced during the application using the method according to the invention, so high productivity in conjunction with high quality is ensured during the production of fiber composite material components. In particular, in the method according to the invention in comparison to monitoring methods known from the prior art, a considerable increase in the productivity and quality is achieved. This is made possible by a control or regulation of the application of the individual webs of the fiber composite material and a monitoring of the respective application process.

The at least one height profile measuring sensor is preferably arranged on the application tool. As the at least one height profile measuring sensor is arranged upstream of the application tool, preferably in an application direction, it is also called a flow sensor. The positioning device preferably comprises a robot, which has at least four, in particular at least five, and, in particular, at least six pivot axes for the application tool, which in each case have an associated drive motor.

The method ensures a high productivity. After an application process, a new application process can be started directly in an opposing application direction, in that the application tool is rotated through 180° relative to the positioning device. Since two height profile measuring sensors are arranged next to one another on the application tool, a measurement of the height profile can take place in each of the two rotational positions.

A method, in which the height profile measuring sensor is configured as a light section sensor and the height profile is measured contactlessly by means of a light section method, ensures a rapid and wear-free measurement of the height profile. Light section sensors, which measure a height profile by means of a light section method also called a triangulation method, are basically known. In light section sensors of this type, a light line is projected onto the surface to be measured and detected again by a camera sensor. The height profile of the surface stands out in the form of line offsets with respect to a reference line on the camera sensor owing to the difference between the projection and observation direction. The line offsets can be detected by means of known image processing algorithms and recorded quantitatively. Actual values of the surface or the surface profile are obtained in three-dimensional Cartesian coordinates, in other words in the x-, y- and z-direction, by means of the movement of the camera sensor. The flatter the light line impinges on the surface, the greater is the line offset due to height differences. As a result, the resolution of the light section sensor can be adjusted, so that the height profile can be measured with a desired accuracy. The light section sensor is preferably configured as a laser section sensor.

A method, in which the height profile is measured during the application of the first web, ensures a high productivity.

A method, in which a longitudinal edge of the first web is detected using the measured height profile and the second web is applied depending on the detected longitudinal edge by means of the positioning device laterally next to the first web, allows application errors in the form of an overlap of webs applied next to one another and/or undesirably large gaps between webs applied next to one another to be avoided. For this purpose, using the measured height profile, the longitudinal edge of the previously applied web is detected, so the web to be applied next to it can be aligned with the detected longitudinal edge by means of the positioning device. The desired values stored in the control device for activating the at least one drive motor or the drive motors are corrected for the application process of the web to be subsequently applied. Moreover, at the beginning of production, the longitudinal edge of a reference web or a reference track can thus be detected, with which the first web to be applied is aligned.

A method, in which a first reference mark is detected using the measured height profile and the second web is applied depending on the detected reference mark by means of the positioning device laterally next to the first web, ensures a uniform quality in the application of the webs during the entire production of the fiber composite material component. Since reference marks positioned at predefined intervals are detected, it is avoided that the corrections of desired values in the individual application processes add up to an inadmissible deviation from the predefined application pattern. The reference marks are, for example, arranged at regular intervals on the component mould.

A method, in which a height difference in relation to the first web is detected using the measured height profile and the second web is applied depending on the detected height difference by means of the positioning device to the first web, allows application errors to be reduced in webs already applied. If an inadmissible height or thickness difference is detected using the height profile in an applied web and/or between two applied webs, the control device activates at least one of the drive motors of the positioning device in such a way that during the application of a subsequent web at the corresponding points, the contact pressing force of the application tool on the component mould is changed, or as the case may be, increased or reduced. As a result inadmissible height differences can be returned again to an admissible tolerance range.

A method, in which a height difference between the first web and a second reference mark is detected using the measured height profile and the second web is applied depending to the detected height difference by means of the positioning device to the first web, ensures a uniform quality in the application of the webs during the entire production of the fiber composite material component. Since, using the height profile, a height difference between the applied web and a reference mark is detected, the occurrence of inadmissible deviations from a predefined application pattern owing to the changing of the contact pressing forces during the application of individual webs is avoided. The reference marks are, for example, arranged at regular intervals on the component mould.

Detected height differences can easily be compensated by a method, in which a contact pressing force of the application tool on the component mould is changed during the application of the second web by means of the positioning device.

A method, in which a contact pressing force of the application tool on the component mould is measured during the application of the second web by means of a force measuring sensor arranged between the application tool and the positioning device, ensures a precise compensation of height differences. Since the contact pressing force of the application tool on the component mould is directly measured by means of the force measuring sensor arranged between the application tool and the positioning device, an intended desired contact pressing force can be precisely adjusted by activating at least one drive motor. In particular, the measured contact pressing force in the control device can be fed to a control algorithm, which determines and adjusts the torque to be adjusted of the at least one drive motor by means of a comparison of the measured contact pressing force with a desired contact pressing force.

A method, in which the webs are applied in relation to an absolute coordinate system, ensures a uniform quality in the application of the webs during the entire production process of the fiber composite material component. Since the position of the application tool relative to the component mould is known in a three-dimensional absolute coordinate system, inadmissible deviations from a predefined application pattern due to corrections of individual application processes can be avoided. The three-dimensional absolute coordinate system may, for example, be provided by an indoor GPS. The provision of the absolute coordinate system may take place as an alternative to or in addition to the provision of reference marks.

A method, in which, during the application of a web, application errors that have occurred during application are detected by means of an optical camera sensor, allows the detection of application errors after the application of a web. Application errors of this type are, for example, bumps, folds, gaps, abutting or overlapping edges and soiling. As the optical camera sensor is preferably arranged downstream of the application tool in the application direction, it is also called a follow-up sensor. The optical camera sensor is, for example, part of a test device, which, by means of a rotationally symmetrical illumination, detects an image sequence at different illumination angles. Test devices of this type are known. Detected application errors can be checked with regard to their quality impairment.

The invention is furthermore based on an object of providing a manufacturing unit, which allows the production of fiber composite material components with high productivity and quality.

This object is achieved by a manufacturing unit for producing fiber composite material components, comprising an application tool to apply a fiber composite material to a component mould, a positioning device, which, to position the application tool arranged thereon relative to the component mould, has a plurality of drive motors, at least one height profile measuring sensor with a detection range directed onto the component mould, wherein two height profile measuring sensors are arranged next to one another on the application tool, and a control device for activating the drive motors. The control device is configured in such a way that a first web of the fiber composite material is applicable to the component mould, a height profile is measurable in such a way that at least a part of the applied first web is located in the detection range of the height profile measuring sensor, and a second web of the fiber composite material is applicable to the component mould in such a way that at least one of the drive motors is activated depending on the measured height profile. The webs are applicable in opposite application directions, wherein the application tool is rotated through 180° relative to the positioning device upon a change in the application direction.

The advantages of the manufacturing unit according to the invention correspond to the advantages already described of the method according to the invention. In particular, the manufacturing unit can be developed in accordance with the method according to the invention.

Further features, advantages and details of the invention emerge from the following description of an embodiment.

DESCRIPTION OF THE PREFERRED EMBODIMENT

Figure 1:
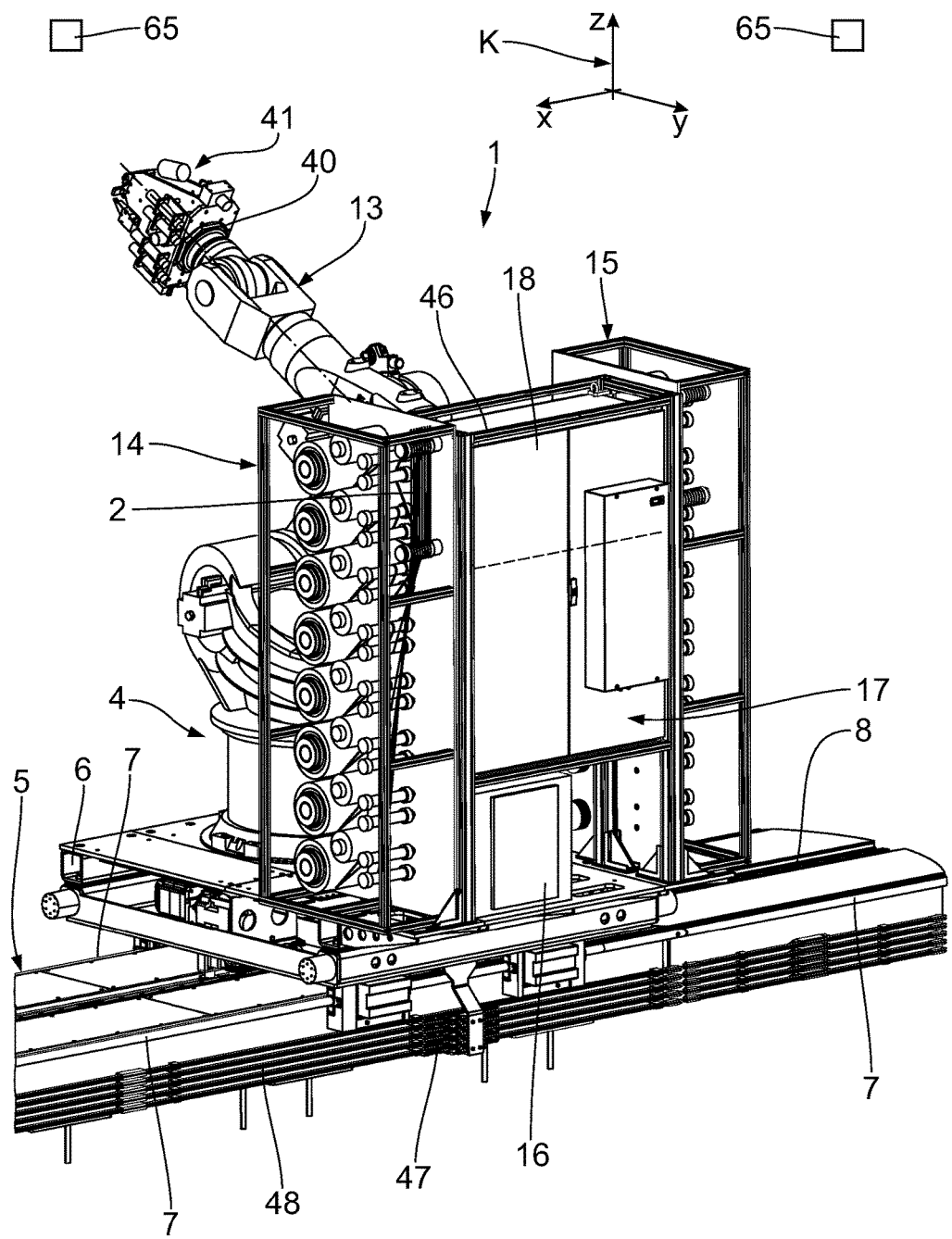
FIG. 1 shows a perspective view of a manufacturing unit for producing fiber composite material components.

A manufacturing unit 1 is used to produce fiber composite material components by applying fiber composite material 2 to a component mould 3. The manufacturing unit 1 has a positioning device 4 with a slide 6, which is movable on a guide path 5 along the component mould 3. For this purpose, the slide 6 is mounted and guided on guide rails 7 and in a guide groove 8. The guide path 5 runs in an x-direction and is spaced apart in a y-direction running perpendicular thereto from the component mould 3. Fastened to a lower side of the slide 6 are two drive motors 9, which drive a toothed wheel 11 to rotate by means of an angular gear 10 in each case. The respective toothed wheel 11 is engaged with a toothed strip 12 arranged in the guide groove 8, so the manufacturing unit 1 is linearly movable on the guide path 5. The upper side of the slide 6 is used as a platform for a robot 13 associated with the positioning device 4, two coolable material stores 14, 15, a cooling device 16, an energy supply device 17 and a control device 18. The drive motors 9 can be activated by means of the control device 18 in such a way that a biasing, and therefore a play-free drive system, is produced between the toothed wheels 11 and the toothed strip 12, so a high positioning accuracy can be achieved. The x-direction and the y-direction and a z-direction running perpendicular thereto form a three-dimensional absolute coordinate system K.

Figure 2:
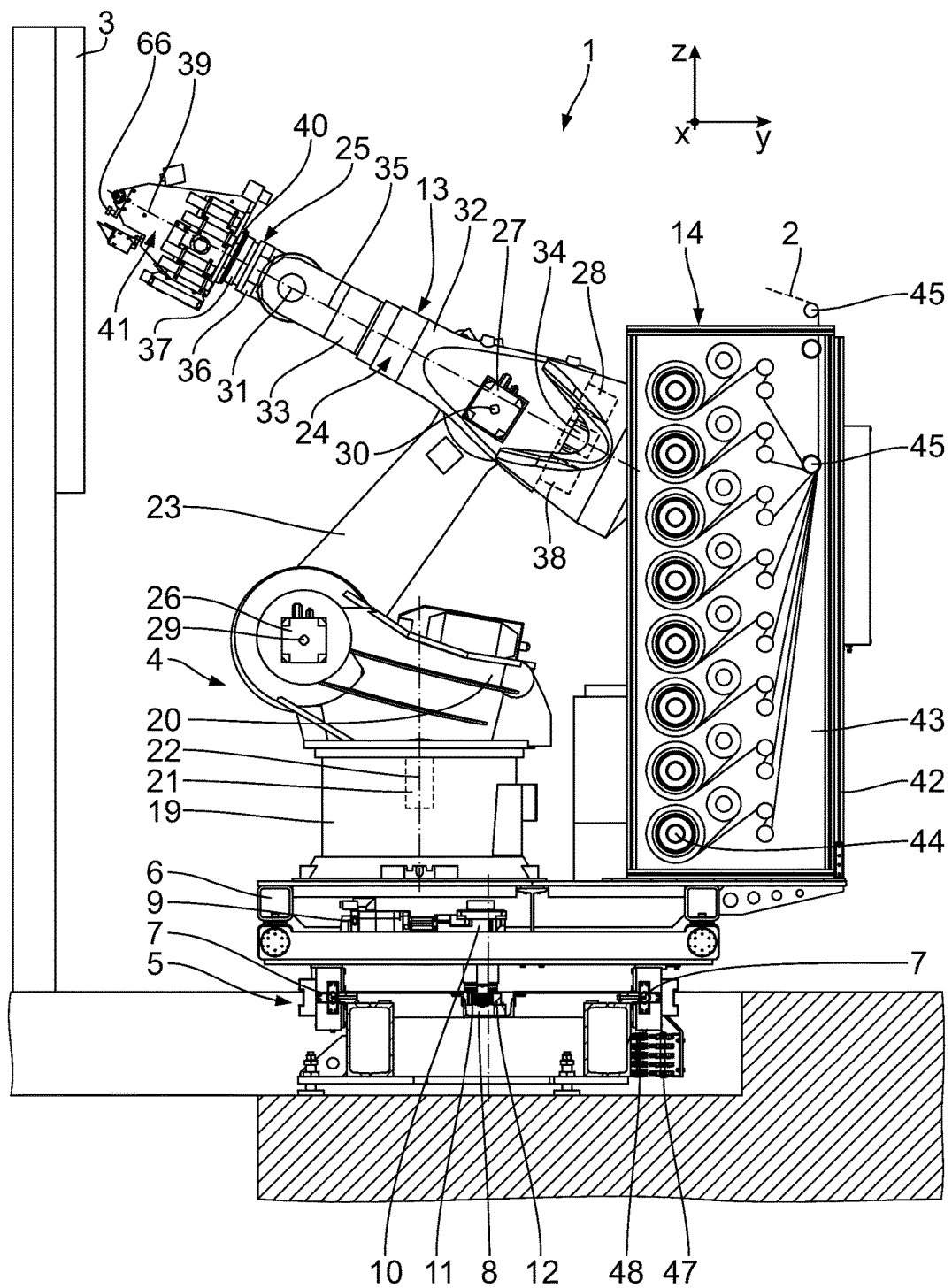
FIG. 2 shows a partially sectional side view of the manufacturing unit in FIG. 1.

The robot or industrial robot 13 is rigidly arranged on the slide 6 by a base frame 19. Arranged on the base frame 19 is a pivot part 20, which is also called a carousel and can be pivoted by means of a drive motor 21 about a vertical pivot axis 22 running parallel to the z-direction. Three pivot arms 23, 24, 25, which are connected to one another at the end and can be pivoted by means of respective drive motors 26, 27, 28 about associated, horizontally running pivot axes 29, 30, 31, are arranged on the pivot part 20. The pivot arm 24 is configured in two parts and has two pivot parts 32, 33, which are pivotable relative to one another about their centre longitudinal axis 35 by means of a drive motor 34. The centre longitudinal axis 35 of the pivot parts 32, 33 therefore forms a further pivot axis. Accordingly, the pivot arm 25 is formed in two parts and has two pivot parts 36, 37, which can be pivoted relative to one another about a centre longitudinal axis 39 by means of a drive motor 38. The centre longitudinal axis 35 and the centre longitudinal axis 39 coincide in FIG. 2. The centre longitudinal axis 39 of the pivot parts 36, 37 therefore forms a further pivot axis.

Arranged on the pivot arm 25 at the end is a force measuring sensor 40 configured as a pressure ring and arranged thereon is an application tool 41 configured as a fiber laying head. The application tool 41 is therefore pivotable about six pivot axes 22, 29, 30, 31, 35 and 39. As the positioning device 4 is movable along the guide path 5, the latter additionally provides a linear axis for the positioning device 4.

The application tool 41 is used to apply the fiber composite material 2 to the component mould 3. The material stores 14, 15 arranged on the slide 6 are used to provide the fiber composite material 2. The material stores 14, 15 are structurally the same, so that only one material store 14 will be described below. The material store 14 has a housing 42, the interior 43 of which is coolable by means of the cooling device 16. A plurality of material rolls 44 with the fiber composite material 2 are rotatably mounted in the interior 43. The fiber composite material 2 is in each case guided by way of a plurality of deflection rollers 45 out of the material store 14 and to the application tool 41. The fiber composite material 2 can be removed from the material store 14 by means of the application tool 41 by exerting a tensile force. The cooling device 16, to cool the two material stores 14, 15, is arranged between them.

A switch cabinet 46, in which the energy supply device 17 and the control device 18 are arranged, is arranged above the cooling device 16 between the material stores 14, 15. The energy supply device 17 is configured in such a way that the manufacturing unit 1 is freely movable along the entire guide path 5. For this purpose, the energy supply device 17 has sliding contacts 17, which are arranged on the slide 6 and are in contact with corresponding slide contacts 48 of the guide path 5. Electrical energy can be transmitted from a central energy supply to the energy supply device 17 by means of the sliding contacts 47, 48. The energy supply device 17, by means of a suitable circuit, supplies all the loads arranged on the slide 6, in particular the drive motors 9, 21, 26, 27, 28, 34 and 38, the cooling device 16 and the control device 18, with electrical energy.

The application tool 41 has a support frame 49 connected to the force measuring sensor 40. The support frame 49 is constructed from a base plate 50 and two triangular side plates 51, 52 fastened laterally thereon. Fastened to the base plate 50 is a fiber feed 53, by which the fiber composite material 2 is guided between the side plates 51, 52 and to a pressure roller 54 rotatably mounted at the end on the side plates 51, 52. Two hollow profile measuring sensors 56, 57, which are fastened laterally next to one another on the side plates 51, 52, are arranged upstream of the pressure roller 54 in an application direction 55 characterized in FIG. 3. These height profile measuring sensors 56, 57 are also called flow sensors. An optical camera sensor 58 in the form of a digital camera is arranged downstream of the pressure roller 54 in the application direction 55 and is arranged on the support frame 49 on a side opposing the hollow profile measuring sensors 56, 57. The camera sensor 58 is also called a follow-up sensor.

Figure 7:
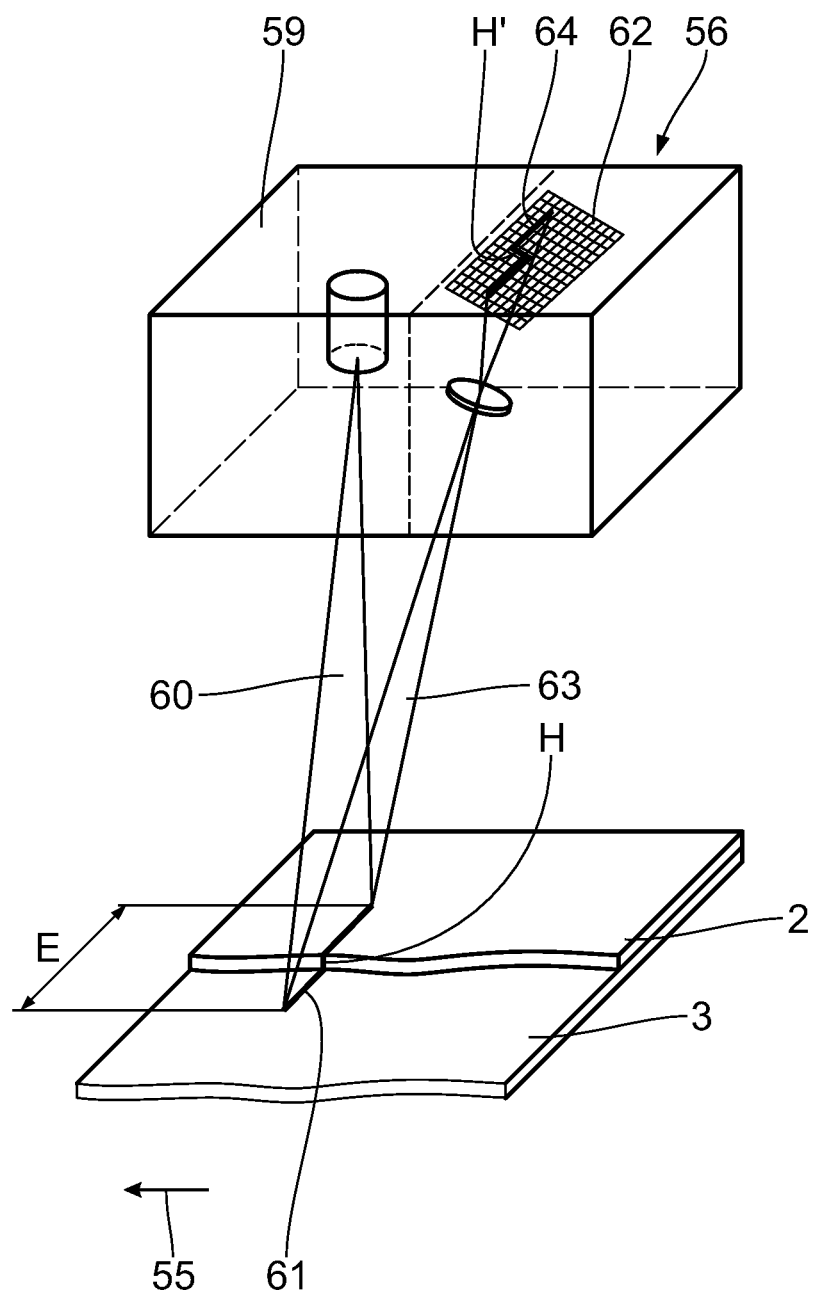
FIG. 7 shows a schematic view of the measuring principle of the height profile measuring sensors.

The height profile measuring sensors 56, 57 are identical, so only the height profile measuring sensor 56 will be described below with the aid of FIG. 7. The height profile measuring sensor 56 is configured as a light section sensor or laser section sensor and will be designated in this way below. The light section sensor 56 has a light production unit 59 for producing a light beam 60, which can be projected as a light line 61 onto the component mould 3 or the fiber composite material 2 applied thereon. The length of the light line 61 defines a detection region E, which is arranged transverse to the application direction 55, of the light section sensor 56. A reflected light beam 63 can be detected by means of a detector 62 in such a way that the light line 61 is imaged in the form of a light line image 64 on the detector 62. For this purpose, the light beam 60 has a projection direction, which encloses an angle with the surface normal of the component mould 3. The detector 62 is arranged relative to the surface normal at an angle in such a way that the light beam 63 reflected in an observation direction impinges on the detector 62. If a height profile H is located in the detection region E, a corresponding height profile H' is imaged as a line offset to a reference line on the detector 62, which can be measured by means of conventional image processing algorithms.

The camera sensor 58 is, for example, part of a test device, which has an illumination that is rotationally symmetrical about a centre longitudinal axis with annularly arranged light sources. Image sequences with different illumination angles can be recorded with this.

An indoor GPS, which has a plurality of transmitting units 65 distributed and spaced apart in the space, is used to provide the absolute coordinate system K. These are illustrated by way of example in FIG. 1. The position signals emitted by the transmitting units 65 can be measured by means of a receiving unit 66. The receiving unit 66 is, for example, arranged on the support frame 49 close to the pressure roller 54. The received position signals can be transmitted to the control device 18, which determines therefrom an absolute position of the application tool 41 in the three-dimensional absolute coordinate system K.

At the beginning of the production, no fiber composite material 2 has yet been applied to the component mould 3. The fiber composite material 2 is applied in web form to the component mould 3. The component mould 3, for this purpose, has a reference track S projecting over the surface of the component mould 3, which, for example, can be detected by means of the light section sensor 56 or 57. Moreover, the component mould 3 has first reference marks $R_1$, which are uniformly spaced apart in the x-direction, also project over the surface of the component mould 3 and can be detected by means of the light section sensor 56 or 57. In addition to the first reference marks $R_1$, second reference marks $R_2$, which have one and/or more predefined heights compared to the surface of the component mould 3, are arranged on the component mould 3.

Figure 3:
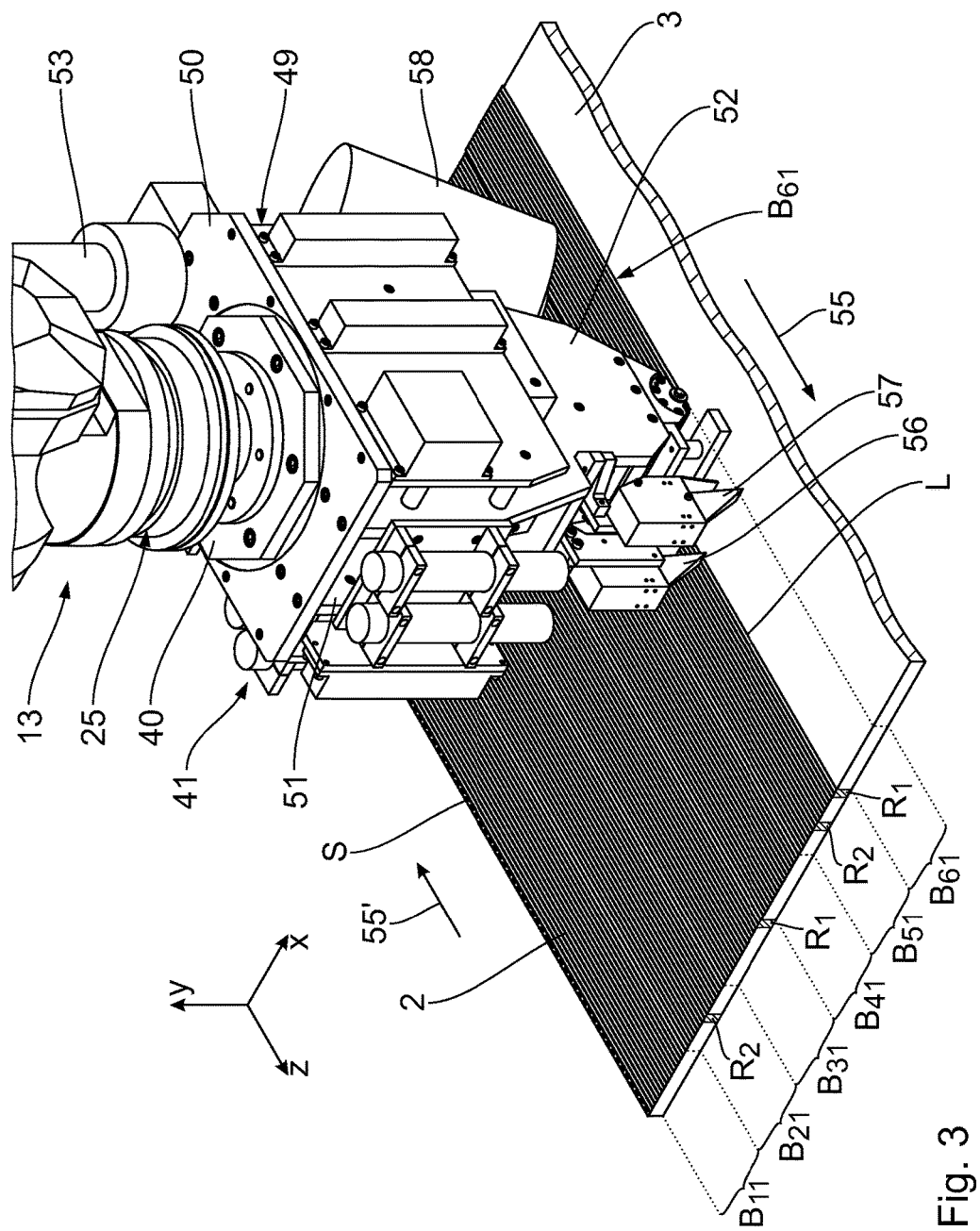
FIG. 3 shows a first perspective view of an application tool of the manufacturing unit in FIG. 1 with two height profile measuring sensors and an optical camera sensor.
Figure 4:
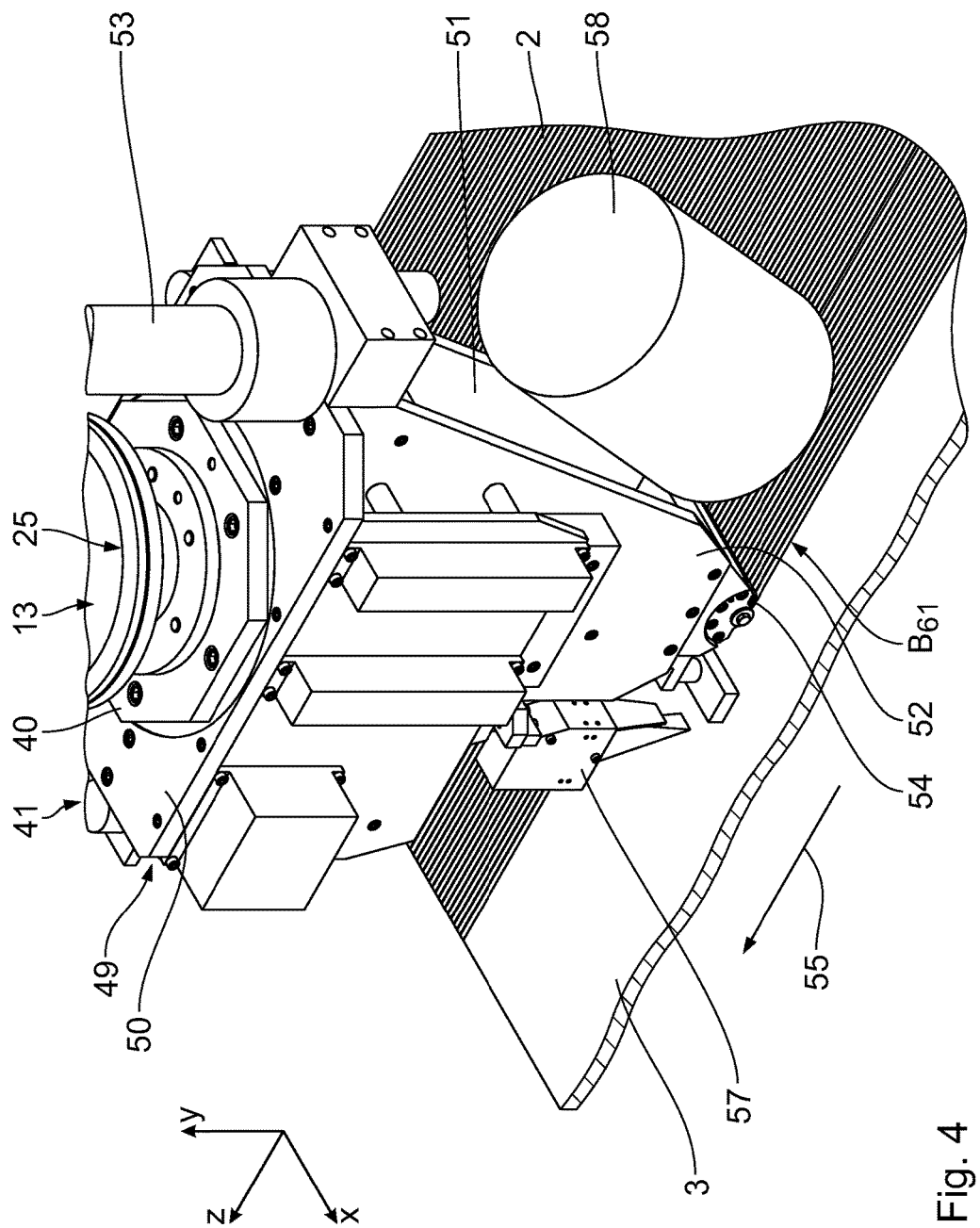
FIG. 4 shows a second perspective view of the application tool in FIG. 3.
Figure 5:
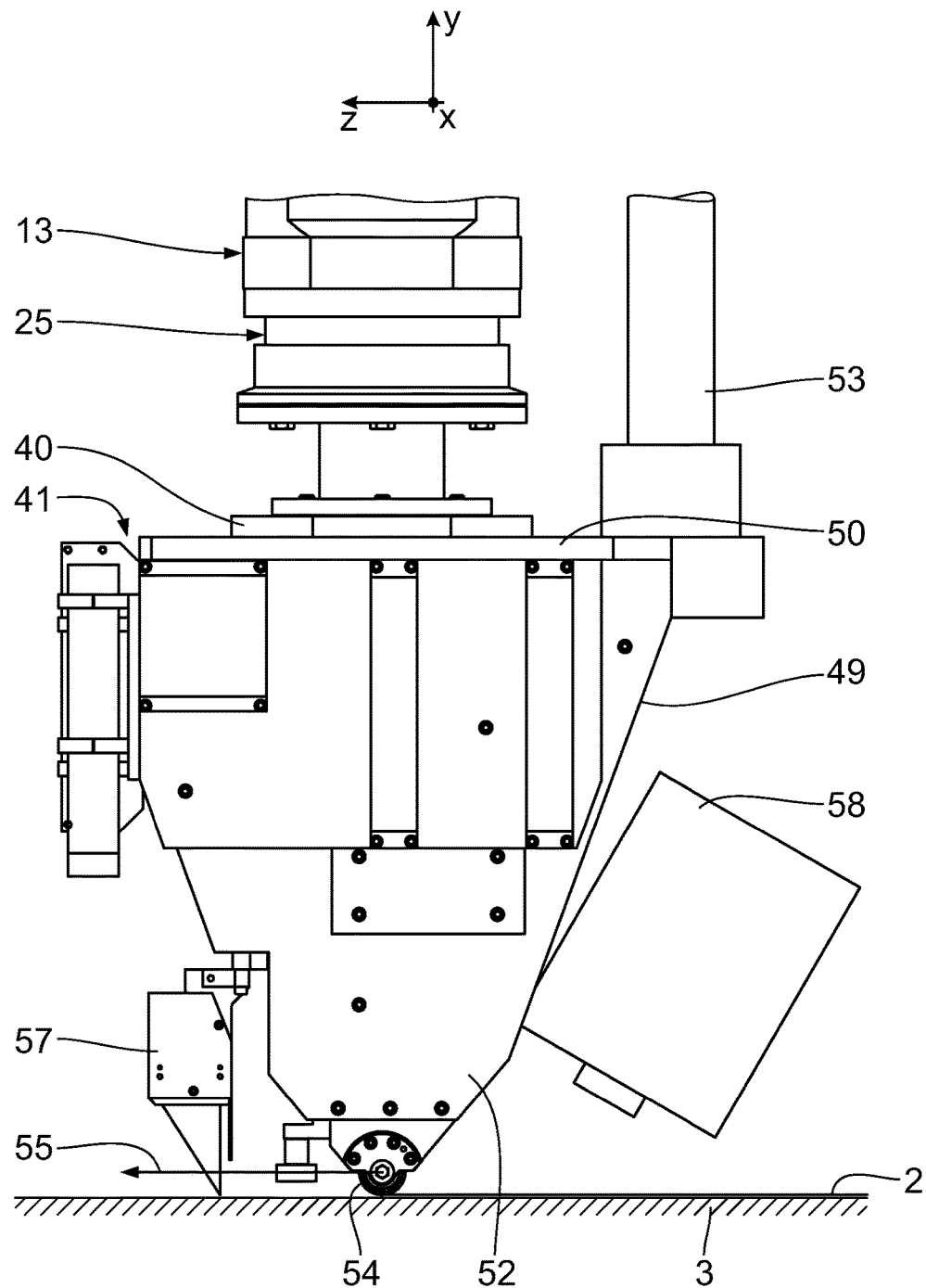
FIG. 5 shows a side view of the application tool in FIG. 3.
Figure 6:
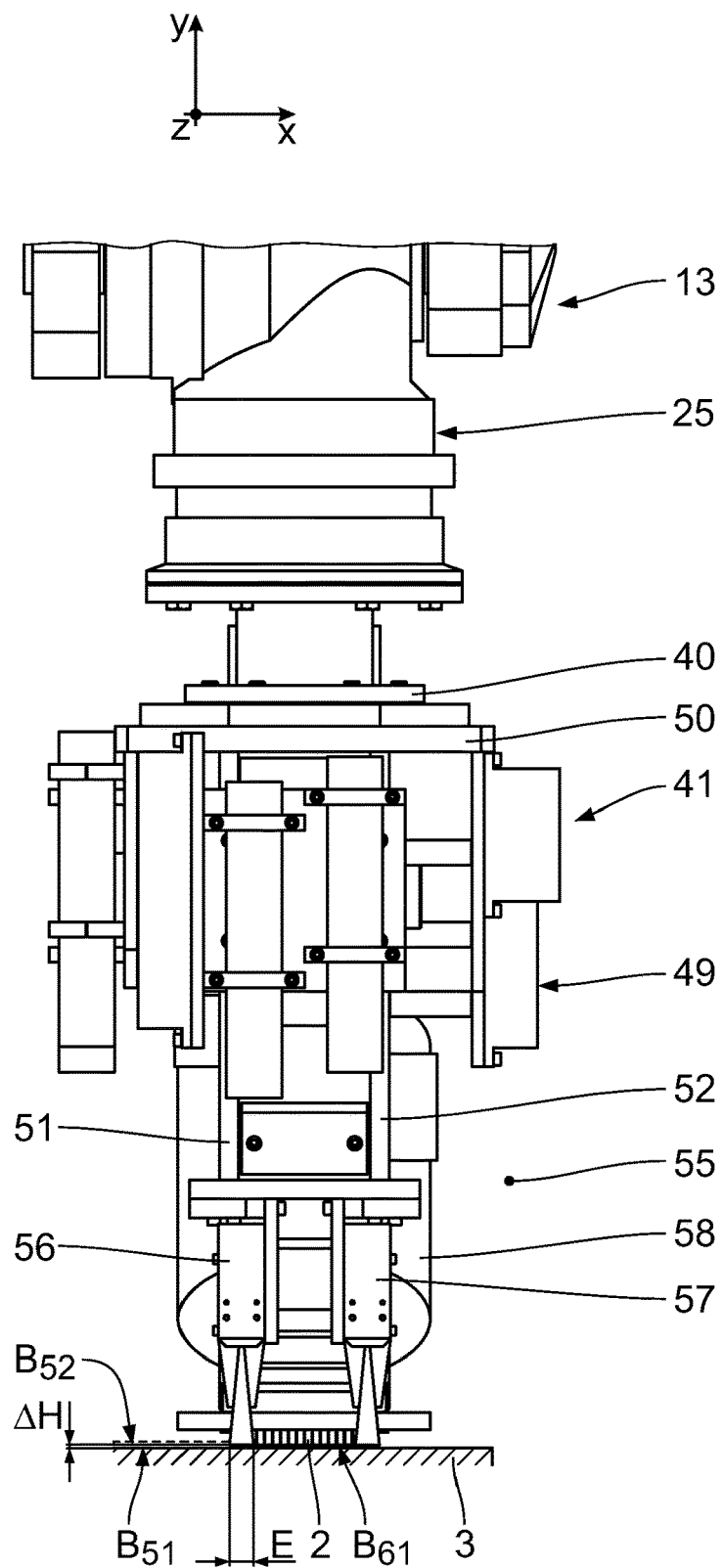
FIG. 6 shows a front view of the application tool in FIG. 3.

To apply a first web $B_{11}$, the reference track S is detected in the described manner by means of the light section sensor 57. During the detection, the application tool 41 is moved by means of the positioning device 4 and the first web $B_{11}$ is applied to the component mould 3 in the application direction 55'. At the end of the application process, the application tool 41 is rotated about the pivot axis 39 by means of the drive motor 38 through 180°, so the production process can be continued directly with the application of a second web $B_{21}$ in the application direction 55. FIG. 3 shows five webs $B_{11}$ to $B_{51}$ applied to the component mould 3. The application tool 41 is shown during the application of a sixth web $B_{61}$ in the application direction 65. The web $B_{51}$ applied beforehand forms a longitudinal edge L, which runs in the z-direction and lies in the detection region E of the light section sensor 56. The longitudinal edge L forms a height profile H, which is measured during the application of the web $B_{61}$ with the light section sensor 56. As the light section sensor 56 is arranged upstream in the application direction 55 of the pressure roller 54, the web $B_{61}$, depending on the longitudinal edge L detected with the aid of the measured height profile H, can be applied precisely laterally next to the web $B_{51}$ by means of the positioning device 4. Application errors, such as, for example, an overlap of the webs $B_{51}$ and $B_{61}$ or too large a gap between the webs $B_{51}$ and $B_{61}$ can thus be avoided. If the course of the web $B_{51}$ differs from the desired course, the desired values stored in the control device 18 are corrected to apply the web $B_{61}$ with the aid of the detected longitudinal edge L.

So that the correction of the desired values when applying the webs $B_{11}$ to $B_{61}$, and further webs does not lead to an inadmissible deviation from an application pattern, reference marks $R_1$ are arranged at regular intervals on the component mould 3 and are detected by the light section sensors 56, 57 during application. If an inadmissible deviation from one of the reference marks $R_1$ is determined by means of the control device 18, this is taken into account in the subsequent correction of desired values, so the inadmissible deviation is returned again to an admissible tolerance range. The control device 18, with the aid of the measured height profile H, thus activates at least one of the drive motors 9, 21, 26, 27, 28, 34, 38 in such a way that application errors are avoided. Application errors of this type are, for example, overlaps or gaps.

During the application of the webs $B_{11}$ to $B_{61}$, application errors that have occurred during the application are detected by means of the optical camera sensor 58 and checked and stored in the control device 18.

If, during the application of the web $B_{61}$ a height or thickness difference $\Delta H$ of the applied web $B_{51}$ to the surface of the component mould 3, which lies outside a predefined tolerance range, is detected, this is noted in the control device 18. The same applies when a height difference $\Delta H$ is detected during the later application of a web on an already applied layer of webs is detected. If, during a subsequent application process, a web $B_{52}$ is applied to the web $B_{51}$, the contact pressing force of the application tool 41 on the component mould 3 is changed by means of the positioning device 4 in such a way that the detected height difference $\Delta H$ is returned again to the tolerance range or is reduced. The contact pressing force is measured by means of the force measuring sensor 40. The measured values are transmitted to the control device 18, which compares them with desired values and, using the comparison, activates the drive motors 9, 21, 26, 27, 28, 34, 38 in such a way that the desired contact pressing force is adjusted. A layer thickness measurement and adjustment is thus carried out.

The reference marks $R_2$, which characterize the desired heights of the applied layers, are detected during the application of the layers. If, for example, when applying the web $B_{52}$, an inadmissible deviation from the reference mark $R_2$ is detected, this is noted in the control device 18, which changes the contact pressing force during subsequent application processes in such a way that the inadmissible deviation is returned again to an admissible tolerance range. A layer thickness measurement and adjustment is thus realized.

As the positioning of the application tool 41 takes place in the absolute coordinate system K, the monitoring of the adherence to the application pattern can also take place by means of this absolute coordinate system K. In this case, the reference marks $R_1$, $R_2$ and the reference track S can also be dispensed with. The monitoring preferably takes place both by means of the reference marks $R_1$, $R_2$ and the reference track S and also by means of the absolute coordinate system K.

What is claimed is:

1. A method for producing fiber composite material components comprising the following steps:
    providing a manufacturing unit to apply a fiber composite material to a component mould,
        wherein the manufacturing unit has a positioning device and an application tool arranged thereon,
        wherein the positioning device comprises a robot which has at least four pivot axes for the application tool,
        wherein the positioning device to position the application tool relative to the component mould has a plurality of drive motors, which are activatable by a control device, the plurality of drive motors comprising a drive motor associated with each of the at least four pivot axes, and
        wherein the manufacturing unit has at least two height profile measuring sensors, each with a detection range directed onto the component mould;
    applying a first web of the fiber composite material to the component mould;
    measuring a height profile in such a way that at least a part of the applied first web is located in the detection range of one of the height profile measuring sensors; and
    applying a second web of the fiber composite material to the component mould in such a way that the control device activates at least one of the drive motors depending on the measured height profile, wherein the control device is operable to activate the at least one of the drive motors based on only one of the at least two height profile measuring sensors;
    wherein the first and second webs are applied in opposite application directions,
    wherein the at least two height profile measuring sensors comprise a first height profile measuring sensor and a second height profile measuring sensor arranged next to one another on the application tool such that the detection range of the first height profile measuring sensor is spaced apart from the detection range of the second height profile measuring sensor during application of the first and second webs;
    wherein the first height profile measuring sensor measures a height profile of a previously applied web when the application tool is traveling in a first direction;
    wherein the second height measuring sensor measures a height profile of a previously applied web when the application tool is traveling in a second direction;
    wherein the application tool is rotated through 180° relative to the positioning device upon a change in the application direction;
    wherein at least a part of a previously applied web is located in the detection range of one of the first and second height profile measuring sensors and not in the detection range of the other of the first and second height profile measuring sensors when the application tool is traveling in each of the first and second directions; and
    wherein each of the first and second height profile measuring sensors is configured as a light section sensor configured to contactlessly measure the height profile of a previously applied web using a light section method comprising projecting a light line on the previously applied web and detecting a reflection of the light line, wherein the light line projected by each of the first and second height profile measuring sensors defines the detection range of each respective height profile measuring sensor.

2. A method according to claim 1, wherein the height profile is measured during the application of the first web.

3. A method according to claim 1, wherein a longitudinal edge of the first web is detected using the measured height profile and the second web is applied by the positioning device laterally next to the first web depending on the detected longitudinal edge of the first web.

4. A method according to claim 1, wherein a first reference mark is detected using the measured height profile and the second web is applied by the positioning device laterally next to the first web depending on the detected first reference mark.

5. A method according to claim 1, wherein a height difference in relation to the first web is detected using the measured height profile and the second web is applied to the first web by the positioning device depending on the detected height difference.

6. A method according to claim 5, wherein a contact pressing force of the application tool on the component mould is changed during the application of the second web by the positioning device.

7. A method according to claim 5, wherein a contact pressing force of the application tool on the component mould is measured during the application of the second web by a force measuring sensor arranged between the application tool and the positioning device.

8. A method according to claim 1, wherein a height difference between the first web and a second reference mark is detected using the measured height profile and the second web is applied by the positioning device to the first web depending to the detected height difference.

9. A method according to claim 1, wherein the first and second webs are applied in relation to an absolute coordinate system.

10. A method according to claim 1, wherein during the application of a web, application errors that have occurred during application are detected by an optical camera sensor.

11. A method according to claim 1, wherein the first height profile measuring sensor and the second height profile measuring sensor are identical.

12. A manufacturing unit for producing fiber composite material components, comprising:
    an application tool to apply a fiber composite material to a component mould;
    a positioning device comprising a plurality of drive motors to position the application tool arranged thereon relative to the component mould, wherein the positioning device comprises a robot which has at least four pivot axes for the application tool and wherein the plurality of drive motors comprise a drive motor associated with each of the at least four pivot axes;
    at least two height profile measuring sensors, each with a detection range directed onto the component mould, the at least two height profile measuring sensors comprising a first height profile measuring sensor and a second height profile measuring sensor arranged next to one another on the application tool, wherein the first height profile measuring sensor measures a height profile of a previously applied web when the application tool is traveling in a first direction and the second height measuring sensor measures a height profile of a previously applied web when the application tool is traveling in a second direction; and a control device for activating the plurality of drive motors, wherein the control device is operable to activate the plurality of drive motors based on only one of the at least two height profile measuring sensors, the control device being configured in such a way that a first web of the fiber composite material is applicable to the component mould, a height profile is measurable in such a way that at least a part of the applied first web is located in the detection range of one of the height profile measuring sensors, and a second web of the fiber composite material is applicable to the component mould in such a way that at least one of the drive motors is activated depending on the measured height profile;

wherein the first and second webs are applicable in opposite application directions;

wherein the application tool is rotated through 180° relative to the positioning device upon a change in the application direction;

wherein at least a part of a previously applied web is located in the detection range of one of the first and second height profile measuring sensors and not in the detection range of the other of the first and second height profile measuring sensors when the application tool is traveling in each of the first and second directions;

wherein the detection range of the first height profile measuring sensor is spaced apart from the detection range of the second height profile measuring sensor during application of the first and second webs; and wherein each of the first and second height profile measuring sensors is configured as a light section sensor configured to contactlessly measure the height profile of a previously applied web using a light section method comprising projecting a light line on the previously applied web and detecting a reflection of the light line, wherein the light line projected by each of the first and second height profile measuring sensors defines the detection range of each respective height profile measuring sensor.

13. A method for producing fiber composite material components comprising the following steps:

providing a manufacturing unit to apply a fiber composite material to a component mould, wherein the manufacturing unit has a positioning device and an application tool arranged thereon, wherein the positioning device comprises a robot which has at least four pivot axes for the application tool, wherein the positioning device to position the application tool relative to the component mould has a plurality of drive motors, which are activatable by a control device, the plurality of drive motors comprising a drive motor associated with each of the at least four pivot axes, and wherein the manufacturing unit has two height profile measuring sensors arranged next to one another on the application tool, each with a detection range directed onto the component mould;

applying a first web of the fiber composite material to the component mould;

measuring a height profile in such a way that at least a part of the applied first web is located in the detection range of one of the height profile measuring sensors; and applying a second web of the fiber composite material to the component mould in such a way that the control device activates at least one of the drive motors depending on the measured height profile, wherein the first and second webs are applied in opposite application directions, wherein the control device is operable to activate the at least one of the drive motors based on only one of the two height profile measuring sensors;

wherein a first reference mark on the component mould is detected using one of the height profile measuring sensors during the application of the first web and the second web is applied by the positioning device laterally next to the first web depending on the detected first reference mark;

wherein the application tool is rotated through 180° relative to the positioning device upon a change in the application direction;

wherein at least a part of a previously applied web is located in the detection range of one of the height profile measuring sensors and not in the detection range of the other of the height profile measuring sensors when the application tool is traveling in each of the opposite application directions;

wherein the detection ranges of the two height profile measuring sensors are spaced apart during application of the first and second webs; and wherein each of the height profile measuring sensors is configured as a light section sensor configured to contactlessly measure the height profile of a previously applied web using a light section method comprising projecting a light line on the previously applied web and detecting a reflection of the light line, wherein the light line projected by each of the height profile measuring sensors defines the detection range of each respective height profile measuring sensor.

* * * * *